July 7, 1964    P. G. HOLT    3,140,341
MIRROR POSITIONING APPARATUS
Filed Nov. 30, 1961    2 Sheets-Sheet 1

INVENTOR.
PLINY G. HOLT
BY
ATTORNEY

July 7, 1964   P. G. HOLT   3,140,341
MIRROR POSITIONING APPARATUS
Filed Nov. 30, 1961   2 Sheets-Sheet 2
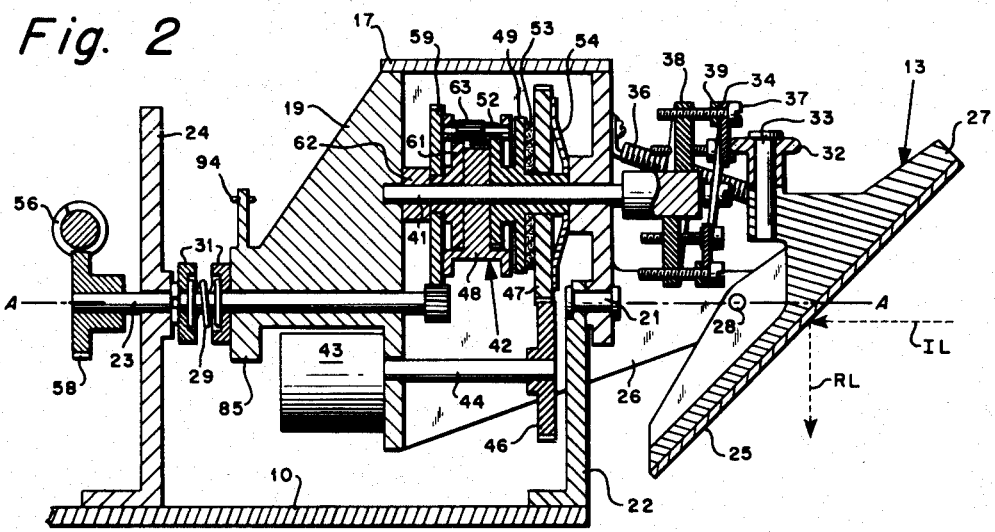
Fig. 2
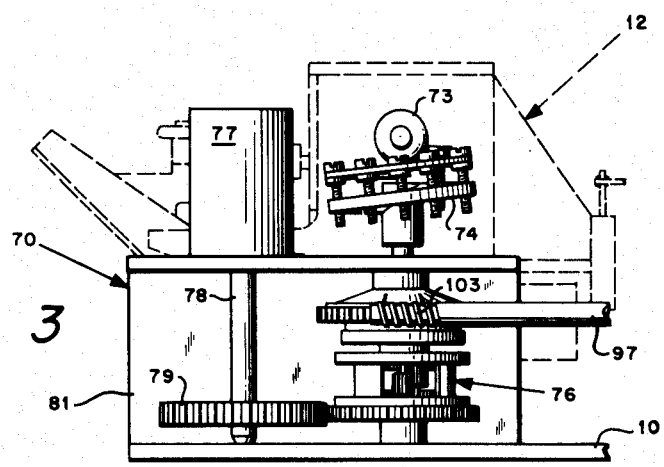
Fig. 3
Fig. 4
INVENTOR.
PLINY G. HOLT
BY
ATTORNEY

United States Patent Office 3,140,341
Patented July 7, 1964

3,140,341
MIRROR POSITIONING APPARATUS
Pliny G. Holt, Bethesda, Md., assignor to the United States of America as represented by the Secretary of the Navy
Filed Nov. 30, 1961, Ser. No. 156,176
9 Claims. (Cl. 88—84)
(Granted under Title 35, U.S. Code (1952), sec. 266)

The invention described herein may be manufactured and used by or for the Government of the United States of America for governmental purposes without the payment of any royalties thereon or therefor.

The present invention relates to a mirror positioning apparatus for use in a light projector system and more particularly to a mirror positioning apparatus for use in a light projector system by which a plurality of images optically projected on a screen can be independently or concomitantly moved thereon.

Optical displays are frequently used in the combination with maps whereby characterized light images or symbols representing stationary or moving objects at certain geographical positions are projected onto corresponding map positions. Basically, there are two projecting modes for obtaining such displays. One mode employs a cathode ray tube with a transparent map placed on its screen; and the other mode optically projects light beams on an opaque or translucent map. The former requires electronic symbol generators which are displaced on the screen of the cathode ray tube by the deflection of electron beams within the tube. As will be understood by those skilled in the art, the cathode ray tube mode in airborne use possesses certain disadvantages not found in the light projecting mode. The latter mode forms symbols by projecting light beams through characterized apertures or reticles which are displaced on the screen by subsequently deflecting the light beams. One embodiment of a light projecting mode of optical display is disclosed in application Serial No. 136,982 of Pliny G. Holt for Tactical Navigation System filed September 1, 1961. In heretofore known light projecting modes of optical displays, symbol motion on the screen usually involves a complex gimbal arrangement in the projection unit; and where a plurality of symbols are involved which must be movable independently with respect to each other, the equipment becomes complex and gigantic.

Optical displays play a very prominent role in modern antisubmarine warfare whereby the pilot of an aircraft can obtain a pictorial representation of a complete tactical situation. Aircraft and sonobuoy positions are displayed on a map of an area of interest by symbols. In addition to providing that each symbol be independently adjustable, they must be capable of being adjusted in unison for the purpose of centering the overall display. In the cathode ray tube mode, the various symbols being formed may be unisonly translated or slewed across the screen by conventional biasing circuits. But in the light projecting mode, unison slewing of the symbols utilizing the devices heretofore existing further complicated and enlarged the display system beyond the limitations specified for airborne usage.

Accordingly, it is an object of the present invention to provide a mirror positioning apparatus for use in the light projecting mode of optical displays with which light beams characterized into symbols representing stationary or movable objects are reflected onto a display screen, with which the symbols reflected thereon can be positioned at discrete positions by corresponding movement of mirrors in said apparatus, and with which servo motors can move the mirrors to discretely position the symbols anywhere on the screen.

Another object of the invention is to provide a bank of mirrors independently or concomitantly rotatable about respective normal coplanar axes for reflecting respective incident light beams in any direction.

Still another object of the invention is to provide a mirror positioning apparatus for a light projecting mode of optical display which is readily adapted for aircraft environments, which is extremely compact and suitable for operation in the cockpit of a light aircraft, which is accurate and reliable and relatively rugged and insensitive to adverse environmental conditions and which is relatively small, lightweight and inexpensive to manufacture.

Still another object of the invention is to provide a relatively simple and inexpensive mirror positioning apparatus capable of wide application and utility in both military and civilian optical display applications.

Various other objects and advantages will appear from the following description of one embodiment of the invention, and the most novel features will be particularly pointed out hereinafter in connection with the appended claims.

In the accompanying drawings:

FIG. 2 represents a cross-sectional view of one positioning unit of the apparatus as taken along the line 2—2 of FIG. 1;

FIG. 3 represents one actuator of the apparatus as viewed along the line 3—3 of FIG. 1; and FIG. 4 represents a view of one positioning unit as viewed along the line 4—4 of FIG. 1.

Figure 1:
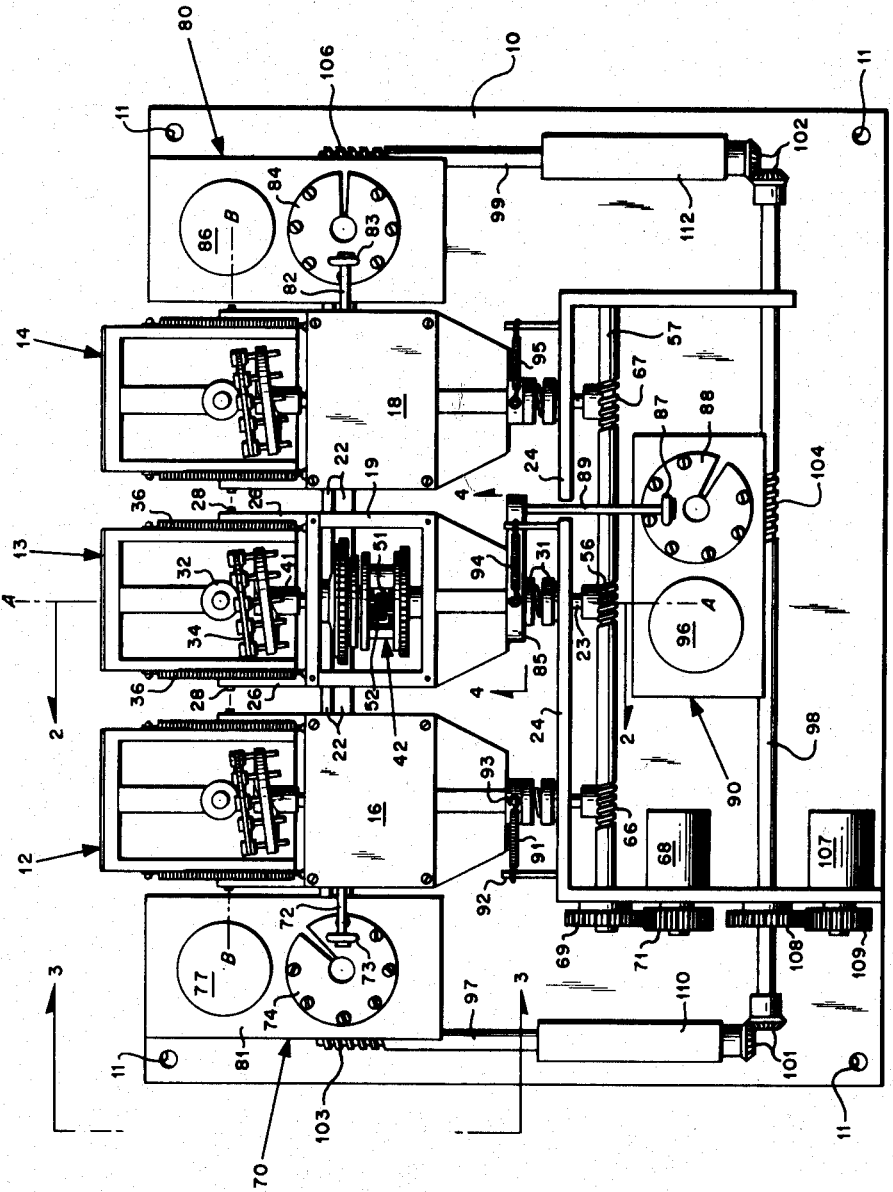
FIG. 1 represents an overall view of a mirror positioning apparatus embodying the present invention.

In the illustrated embodiment of the invention, main support of the mirror positioning apparatus constitutes a base plate 10 which is adapted to be fitted and secured in a light beam projection unit, such as disclosed in application Serial No. 136,982, in any convenient and expedient manner such as by bolt holes 11. Three equally spaced mirror positioning units, indicated generally by the numerals 12, 13 and 14, are journaled to the plate 10 on parallel axes relative to each other. Of course, it will be understood that the invention is not limited to any specific number of units but instead is determined by the particular requirements of the optical display system. The mirror positioning units 12, 13 and 14 are somewhat alike in construction so that details only of the center unit 13 will be explained to avoid repetition. Important differences between the units 12, 13 and 14 will be pointed out where appropriate. In FIG. 1, a cover plate 17, identical to cover plates 16 and 18, has been removed from the unit 13 in order to show mechanical details therebeneath.

Principal structural support of the element 13 obtains from a bifurcated cradle 19 having parallel extending arms 26. The cradle 19 is rotatable about an axis A—A which is parallel to corresponding axes of the units 12 and 14 positioned to the left and right, respectively, of the center unit 13 as viewed in FIG. 1. The cradle 19 is journaled intermediate of its ends by a flanged trunnion pin 21 and an upright stanchion 22 secured to the base plate 10. The non-bifurcated end of the cradle 19 is journaled on the axis A—A by a trunnion shaft 23 and another upright stanchion 24 secured to the base plate 10. The stanchions 22 and 24 also extend laterally from the axis A—A to provide journal supports at the corresponding axes of elements 12 and 14 thus maintaining their parallel relationship. A compression spring 29 helically wound around the trunnion shaft 23 is positioned between two opposing spring retainers 31 and urge the cradle 19 away from the stanchion 24 and against one of the flanges on the pin 21, thus insuring against play or sliding of the cradle 19 along the axis A—A relative to the base plate 10.

The bifurcated arms 26 terminate as journals pivotally supporting a mirror backing plate 27 by two studs 28 coaxial along an axis B—B. The studs 28 are positioned on the backing plate 27 so that the axis B—B is normal to and intersects the axis A—A for all angular positions of either the cradle 19 or the backing plate 27. A mirror element 25 is secured to the outside of the backing plate 27 for reflecting incident light beams, represented by the broken line IL, in a direction represented by the broken line RL.

The angular position of the backing plate 27 about the axis B—B is determined by a cam assembly which includes a resilient circular cam 34 rotatably supported on an axis offset from and parallel to the axis A—A by means to be hereinafter explained. The cam assembly further includes a wheel-type cam follower 32 rotatably connected to the backing plate 27 by cam follower pin 33, the latter having its rotation axis intersecting the rotation axis of the circular cam 34. The periphery of the cam follower 32 is urged against an inner portion of the annular cam 34 by two tension springs 36 connected on each side between the backing plate 27 and the cradle 19.

The annular cam 34 is held in the position just described by an annular array of adjustable stand-off screws 37 threadingly secured in a helically configured annular cam holder 38. The cam 34 is maintained against the grooved head end of the screw 37 by a cam retainer 39. By virtue of its resilience, the profile of the cam 34 can thus be characterized by adjusting the screws 37 to a desired slope which will provide full traverse of a projected symbol across an optical display screen in one revolution of the cam 34. It is further contemplated that the cam profile can be adjusted to compensate for non-linearity of symbol motion versus mirror element rotation as the reflected light beam deviates from a position normal to the screen.

The cam holder 38 is supported on its rotation axis by a cam shamt 41 coaxially fixed thereto for rotation therewith. The cam shaft 41 can be driven by either or both of two separate and independent inputs by a differential gear assembly, indicated generally by the numeral 42, comprising two planetary gear systems. The output of the assembly 42 is from a spool-like carrier 48 which is coaxially fixed on the cam shaft 41 for rotation therewith. One end of the housing 48 defines a coaxial cylindrical well for receiving a sun gear 49 which is also coaxially mounted on the cam shaft 41 and independently rotatable relative thereto. The carrier 48 defines an opening 51 along the length of its hub a portion of which communicates with the cylindrical well and exposes a portion of the gear 49. Planet gear 52 rotatably connected between the flanged ends of the carrier 48 at the opening 51 with its rotation axis parallel to the axis of the cam shaft 41 meshes with the sun gear 49. An input gear 47 is coaxially supported on the cam shaft 41 and independently rotatable relative thereto, and has a friction lining 53 fixed on one side which confronts a flanged portion of the sun gear 49 which extends from the cylindrical well of the carrier 48. The friction lining 53 is urged against the flanged portion of the sun gear 49 by a Belleville-type spring 54 compressed between the side of the gear 47 opposite of the lining 53 and the cradle 19. This slip-clutch connection between the gears 47 and 49 permits overtravel of the gear 49 without danger of structural damage. An electric servo motor 43, mounted in the cradle 19, is drivingly connected to the input gear 47 through an output shaft 44 and a drive gear 48 thus constituting one of the two inputs to the differential gear assembly 42.

The other input to the assembly 42 is obtained from a worm gear 56 cut in a worm drive shaft 57. Pinions 58 and 50 at opposite ends of the trunnion shaft 23 provide an input drive connection from the worm gear 56 to another input gear 59. The latter is coaxially fixed on another sun gear 61 which is supported on the cam shaft 41 and independently rotatable relative thereto. Gears 59 and 61 are maintained in a fixed spaced relationship from the cradle 19 by a spacer ring 62.

The sun gear 61 is received at the opposite end of the carrier 48 in a manner similar to sun gear 49; and is also partly exposed by the opening 51 for meshing with another planet 63 which, in turn, is rotatably connected between the flanges of the carrier 48 on an axis parallel to the shaft 41 like the planet gear 52. The planet gears 52 and 63 also mesh with each other. Gears 49 and 52 have the same number of teeth as gears 61 and 63, respectively, so that the total gear ratio is 1:1. It will be thus observed that upon rotation of the shaft 23 clockwise as viewed from the left on FIG. 2, the differential carrier 48 rotates clockwise in the same direction and causes shaft 41 to rotate therewith due to resistance in the other input from the servo motor 43 which prevents gear 49 from rotating therewith. All of the rotation produced by the worm gear shaft 57 is therefore transmitted into the cam shaft 41. Similarly, all of the rotation of shaft 44 will be transmitted into the cam shaft 41 due to the resistance in the other input from the worm drive shaft 57.

The worm drive shaft 57, FIG. 1, also includes worm gears 66 and 67 appropriately positioned along its length for rotating mirror backing plates of the mirror positioning units 12 and 14, respectively, in the same manner as the backing plate 27 of the unit 13. The worm drive shaft 57 is drivingly connected to a D.C. motor 68 through gears 69 and 71, thereby providing a common drive for each of the backing plates of the units 12, 13 and 14 about the axes B—B irrespective of the positions dictated by their respective servo motors such as servo motor 43 of the unit 13.

As described hereinabove, each of the mirror positioning units 12, 13 and 14 are independently rotatable about axes corresponding to the axis A—A, as shown in FIG. 2. The actual angular positions are determined by cam actuator units, indicated generally by the numerals 70, 80 and 90, respectively. The follower of the unit 12 consists of an extension arm 72 fixed on one side thereof and a wheel 73 rotatably connected at the outer end of the arm 72 for rotation about an axis along its length. The wheel 73 abuts an annular cam 74 which is similar in construction and operation to the cam 88 of the unit 13. This will be particularly apparent from FIG. 3. A differential gear assembly, indicated generally by the numeral 76 is similar in structure to the differential gear assembly 42 but has its output carrier drivingly connected to the cam 74 and one of its input sun gears driven from a servo motor 77 through a shaft 78 and gear 79. Both the motor 77 and the gear assembly 76 are conveniently fixed on the base plate 10 through an auxiliary member 81. The wheel 73 is urged against the cam 74 by a tension spring 91 which is operatively connected between the stanchion 24 and the unit 12 by arms 92 and 93 at each end. The mirror positioning unit 14 is similarly positioned by an extension 82 supporting a follower wheel 83 against a cam 84. Likewise, the cam 84 is rotated through a differential gear assembly by a servo motor 86. The mirror positioning unit 13 is rotated about its axis A—A by a follower wheel 87 rolling on a cam 88. The position of the cam 87 as determined through a differential gear assembly is transmitted through an extension 89 and a lever arm 85 fixed to the cradle 19. Similar tension springs 94 and 95 bias the units 13 and 14, respectively, so that their respective wheels and cams are maintained in positive contact.

The other input sun gear of each of the differential gear assemblies, which also drive the cams 74, 84, and 88, are driven from a single D.C. motor 107 through a system of three worm drive shafts 97, 98, and 99 connected by bevel gearing 101 and 102, thus providing a common drive for each of the backing plates of the units 12, 13 and 14 about the axes corresponding to axis A—A. A worm gear 103 in the shaft 97 engages the other sun gear of the differential assembly 76, and worm gears 104 and 106 similarly mesh with the other sun gears of the respective differential gear assemblies of the units 90 and 80 for driving the cams 88 and 84, respectively. The D.C. motor 107 is drivingly connected to the worm drive shaft 98 through a pair of gears 108 and 109.

The operation of the mirror positioning apparatus should now be apparent. Installed in an optical display system, such as disclosed in application Serial No. 136,-982, supra, the three mirror elements of the units 12, 13 and 14 receive parallel incident light beams from a light projector along the line IL and reflect the light beam along the line RL, as shown in FIG. 2. The incident light beam IL may be characterized into a symbol by a reticle and its reflected image focused on a screen. The direction of the reflected light beam RL from each mirror element 25 of the units 12, 13 and 14 can be separately and independently changed in a vertical plane normal to the axis B—B by the respective servo motor 43 or they can be jointly and unisonly changed therein by the single motor 68. Each reflected light beam RL can also be changed separately and independently in a vertical plane normal to the axis A—A by the motors 77, 90 and 86, respectively, or they can be jointly and unisonly changed therein by the single motor 107.

It may be thus observed that the mirror positioning apparatus of the present invention provides means for operating a bank of reflecting mirrors in an optical display system either separately and independently of each other or jointly and in unison whereby the reflected light beams can be directed in any direction and move an image on a projection screen. When used in a navigational display, the system is especially suitable for use in light aircraft because it occupies relatively little space, requires no special heavy-duty power supply and is rugged and reliable under the most adverse environments. It will be further observed that the mirror positioning apparatus is especially useful in displaying complex tactical situations in such a display since there is no limit to the number of mirror positioning units that can be operated in a bank.

It will be understood that various changes in the details, materials, steps and arrangement of parts which have herein been described and illustrated in order to explain the nature of the invention, may be made by those skilled in the art within the principle and scope of the invention as expressed in the appended claims.

What is claimed is:

1. Mirror positioning apparatus for use in a light projecting optical display system comprising: a base plate formed to be mounted in the system; a plurality of parallel mirror positioning units each having a cradle rotatably supported on said base plate along a first axis, a mirror element defining a planar reflecting surface on one side thereof rotatably supported on said cradle on a second axis normal to said first axis and parallel to the planar surface, said element further positioned to reflect a respective incident light beam of the display system, first differential means mounted on said cradle having two inputs and one output, first cam means operatively connected to said first differential output for positioning said element about said second axis in accordance with the combined first differential inputs, first motor means mounted on said cradle drivingly connected to one of said first differential inputs for rotating said element about said second axis independently of the other of said first differential inputs, shaft means coaxial with said first axis operatively connected to the other of said first differential inputs, second differential means mounted on said base plate having one output and two inputs, second cam means operatively connected to said second differential output for positioning said cradle and said element about said first axis in accordance with the combined second differential inputs, second motor means mounted on said base plate drivingly connected to one of said second differential inputs for rotating said element about said first axis independently of the other of said second differential inputs; first worm gear means operatively connected to each of said shaft means; third motor means operatively connected to said first worm gear means for rotating said elements jointly and in unison about said second axes; second worm gear means operatively connected to each of the other of said second differential inputs; and fourth motor means operatively connected to said second worm gear means for rotating said elements jointly and in unison about said first axes; whereby the reflected light beams can be rotated in any direction.

2. Mirror positioning apparatus as set forth in claim 1 wherein said first and second cam means of each of said units further comprise: an annular cam holder axially connected to the respective input for rotation therewith, an annular array of adjustable stand-off screws threadingly secured near the periphery of said cam holder in parallel relationship to the cam holder axis, a resilient circular cam coaxially supported by said screws in spaced relationship to said cam holder, cam retaining means on each of said stand-off screws for fixing said cam along the length of each of said stand-off screws, a cam follower wheel axially connected to the respective output for rotation independently thereof with its axis intersecting the cam holder axis and positioned to roll on an inner portion of said cam.

3. Mirror positioning apparatus for use in a light projecting optical display system comprising: a base plate; a plurality of parallel mirror positioning means each rotatably supported on said base plate along a first axis and having a mirror element defining a planar reflecting surface on one side thereof rotatably supported thereon on a second axis normal to said first axis and parallel to the planar surface, said element further positioned to reflect a respective incident light beam, first transmission means mounted on said positioning means having two independent inputs and one combined output, first cam means operatively connected between said first transmission output and said element for positioning the latter about said second axis in accordance with the combined first transmission inputs, first motor means mounted on said positioning means drivingly connected to one of said first transmission inputs, shaft means coaxial with said first axis operatively connected to the other of said first transmission inputs, second transmission means mounted on said base plate having two independent inputs and one combined output, second cam means operatively connected between said second transmission output and said positioning means for positioning the latter about said first axis in accordance with the combined second transmission inputs, second motor means mounted on said base plate drivingly connected to one of said second transmission inputs, first gear means drivingly connected to each of said shaft means; third motor means drivingly connected to said first gear means for rotating said elements jointly and in unison about said second axes; second gear means drivingly connected to each of the other of said second transmission inputs; and fourth motor means drivingly connected to said second gear means for rotating said elements jointly and in unison about said first axes; whereby the reflected light beams can be rotated in any direction.

4. Positioning apparatus, comprising: a plurality of positioners each rotatably supported in parallel along a first axis and having an element rotatably supported on said positioner on a second axis normal to said first axis, first differential means mounted on said positioner having two inputs and one output, first cam means operatively connected between said first differential output and said element for positioning the latter about said second axis in accordance with the combined first differential inputs, first motor means mounted on said positioner drivingly connected to one of said first differential inputs for rotating said element about said second axis independently of the other of said first differential inputs, shaft means coaxial with said first axis operatively connected to the other of said first differential inputs, second differential means having one output and two inputs, second cam means operatively connected between said second differential output and said element for positioning the latter about said first axis in accordance with the combined second differential inputs, second motor means drivingly connected to one of said second differential inputs for rotating said element about said first axis independently of the other of said second differential inputs; first worm gear means operatively connected to each of said shaft means for rotating said elements jointly and in unison about said second axes; and second worm gear means operatively connected to each of the other of said second differential inputs for rotating said first elements jointly and in unison about said first axes.

5. Mirror positioning apparatus for use in a light projecting optical display system, comprising: a base plate, a cradle rotatably supported on said base plate along a first axis, a planar mirror rotatably supported on said cradle on a second axis normal to said first axis, said mirror positioned to reflect an incident light beam of the display system, first differential means mounted on said cradle having two inputs and one output, first cam means operatively connected to said first differential output for positioning said mirror about said second axis in accordance with the combined first differential inputs, first motor means mounted on said cradle drivingly connected to one of said first differential inputs for rotating said element about said second axis independently of the other of said first differential inputs, shaft means coaxial with said first axis operatively connected to the other of said first differential inputs, second differential means mounted on said base plate having two inputs and one output, second cam means operatively connected to said second differential output for positioning said cradle and said element about said first axis in accordance with the combined second differential inputs, second motor means mounted on said base plate drivingly connected to one of said second differential inputs for rotating said element about said first axis independently of the other of said second differential inputs, third motor means operatively connected to said shaft means for rotating said element about said second axis, and fourth motor means operatively connected to the other of said second differential inputs for rotating said element about said first axis.

6. Mirror positioning apparatus as set forth in claim 5 wherein said first and second cam means further comprise: an annular cam holder axially connected on its axis to the respective input for rotation therewith, an annular array of adjustable stand-off screws threadingly secured near the periphery of said cam holder in parallel relationship to the cam holder axis, a resilient circular cam coaxially supported by said screws in spaced relationship to said cam holder, cam retaining means on each of said stand-off screws for fixing said cam along the length of each of said stand-off screws, a cam follower wheel axially connected to the respective output for rotation independently thereof with its axis intersecting the cam holder axis and positioned to roll on an inner portion of said cam.

7. Mirror positioning apparatus comprising: a base plate, a mirror element rotatably supported on said respective first and second axes normal to each other, first transmission means mounted on said element having two independent inputs and one combined output, first cam means operatively connected between said first transmission output and said element for positioning the latter about said second axis in accordance with the combined first transmission inputs, first motor means mounted on said element drivingly connected to one of said first transmission inputs, shaft means coaxial with said first axis operatively connected to the other of said first transmission inputs, second transmission means mounted on said base plate having two independent inputs and one combined output, second cam means operatively connected between said second transmission output and said element for positioning the latter about said first axis in accordance with the combined second transmission inputs, second motor means mounted on said base plate drivingly connected to one of said second transmission inputs, third motor means operatively connected to said shaft means for rotating said element about said second axis, and fourth motor means operatively connected to the other of said second differential inputs for rotating said element about said first axis.

8. Positioning apparatus, comprising: a base, a positioner rotatably supported on said base along a first axis, an element rotatably supported on said positioner on a second axis normal to said first axis, first differential means mounted on said positioner having two inputs and one output, first connecting means between said first differential output and said element for positioning the latter about said second axis in accordance with the combined first differential inputs, first motor means mounted on said positioner drivingly connected to one of said first differential inputs for rotating said element about said second axis independently of the other of said first differential inputs, shaft means coaxial with said first axis operatively connected to the other of said first differential inputs, second differential means mounted on said base and having two inputs and one output, second connecting means between said second differential output and said element for positioning the latter about said first axis in accordance with the combined second differential inputs, and second motor means drivingly connected to one of said second differential inputs for rotating said element about said first axis independently of the other of said second differential inputs.

9. An adjustable cam device, comprising: an annular cam holder adapted to be axially connected to an input for rotation, an annular array of adjustable stand-off screws threadingly secured near the periphery of said cam holder in parallel relationship to the cam holder axis, a resilient circular cam element coaxially supported by said screws in spaced relationship to said cam holder, cam retaining means on each of said stand-off screws for fixing said cam element along the length of each of said stand-off screws, a cam follower wheel axially connected to an output for rotation independently thereof with its axis intersecting said cam holder axis, said wheel further positioned to roll on an inner portion of said cam element.

References Cited in the file of this patent
UNITED STATES PATENTS

| | | |
|---|---|---|
| 1,833,607 | Greenfield | Nov. 24, 1931 |
| 2,315,171 | Voorheis | Mar. 30, 1943 |
| 2,397,783 | Ford | Apr. 2, 1946 |
| 2,660,087 | Domeshek | Nov. 24, 1953 |
| 2,940,172 | Bell et al. | June 14, 1960 |
| 3,023,315 | Muskat | Feb. 27, 1962 |